No. 673,912. Patented May 14, 1901.
B. G. LAMME.
SYSTEM OF ELECTRICAL DISTRIBUTION.
(Application filed July 14, 1900.)

(No Model.)

WITNESSES:
C. L. Belcher
Birney Hines

INVENTOR
Benjamin G. Lamme
BY
Kerby E. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC & MANUFACTURING COMPANY, OF PENNSYLVANIA.

SYSTEM OF ELECTRICAL DISTRIBUTION.

SPECIFICATION forming part of Letters Patent No. 673,912, dated May 14, 1901.

Application filed July 14, 1900. Serial No. 23,654. (No model.)

*To all whom it may concern:*

Be it known that I, BENJAMIN G. LAMME, a citizen of the United States, residing at Pittsburg, in the county of Allegheny and State of Pennsylvania, have invented new and useful Improvements in Systems of Electrical Distribution, of which the following is a specification.

My invention relates to systems of electrical distribution, and particularly to alternating and direct current systems that are utilized for operating independent sets of translating devices and are so located as to be more or less interconnected.

The object of my invention is to provide a means for transferring energy from an alternating-current system to a direct-current system, and vice versa, in order to accommodate changes in load on either or both systems where they are so located with reference to each other as to permit of such transference of energy. With these ends in view I have devised the means shown in the accompanying drawings, in which—

Figure 1:
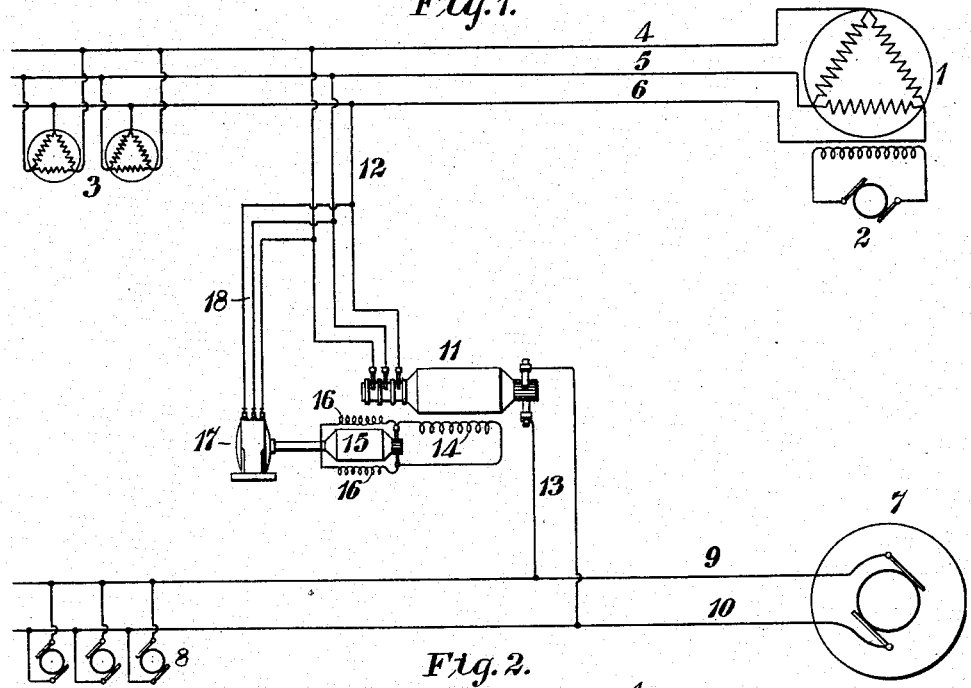
Figure 2:
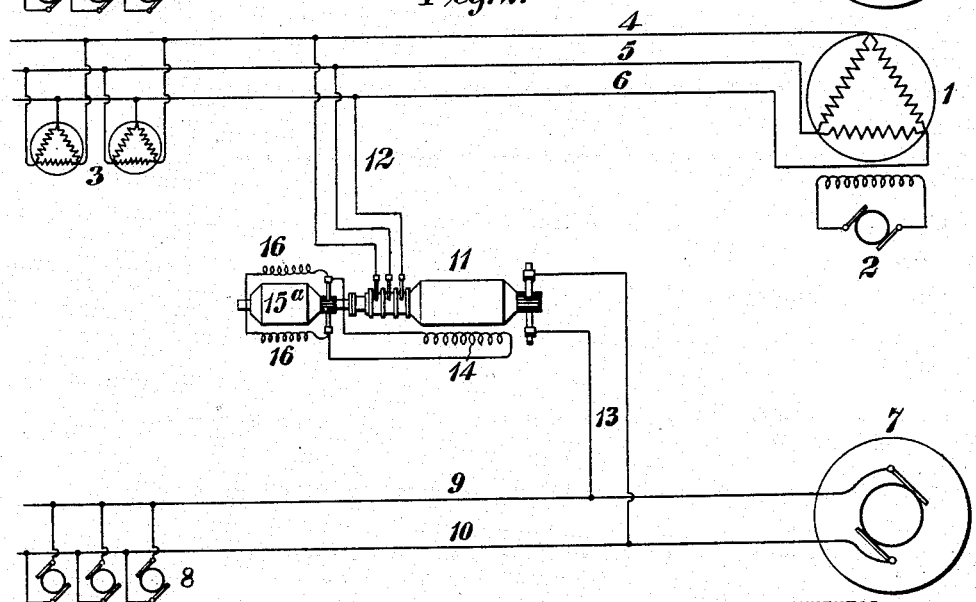

Figure 1 is a diagram of the apparatus and circuits embodying my invention, and Fig. 2 is a similar view of a modification.

Referring to Fig. 1, a three-phase generator 1, having a suitable exciter 2, supplies translating devices 3 by means of conductors 4, 5, and 6, and a direct-current generator 7 supplies translating devices 8 through conductors 9 and 10, the two generators 1 and 7 being located either in the same station or sufficiently near, so that the conductors 4, 5, and 6 and 9 and 10 may be connected together by means of a rotary converter 11 and the alternating-current conductors 12 and direct-current conductors 13. The rotary-converter field-magnet winding 14 is energized by means of an exciter 15, which is here shown as having a shunt field-magnet winding 16, though it may under certain conditions have either a series winding or both a series and a shunt winding. The armature of the exciter 15 is mechanically driven by a motor 17, which is in turn electrically driven from the alternating-current side of the rotary converter, the connection, as shown, being by means of conductors 18, leading from the conductors 12. It will be seen that by this arrangement the exciter of the field-magnet winding 14 is driven substantially in synchronism with the alternating-current generator 1.

Referring now to Fig. 2, the several elements of the system are the same as those shown in Fig. 1 except as will be specifically pointed out, and since the same reference-numerals are employed the description heretofore given may be read in connection with this figure and need not, therefore, be repeated. In this modification the exciter 15ª for the rotary-converter field-magnet winding 14 instead of being driven by a separate motor, as shown in Fig. 1, is mechanically driven by the rotary converter itself, having its armature either mounted on the armature-shaft of the rotary converter or coupled thereto or connected by means of suitable gearing. As shown, the armature-shafts are coupled together, so as to run in synchronism.

It will be understood in connection with each of the figures that a two-phase alternating-current system may be employed instead of the three-phase system shown and that the rotary converter or converters may have field-magnet windings other than or in addition to the separately-excited winding shown, if desired. With either of the arrangements shown the rotary converter tends automatically to transfer energy from either system to the other dependent upon the conditions of load and the speed, &c., of the prime movers of the two systems.

Assuming, first, that the alternating-current system is overloaded and drops in its speed or rate of alternations, the rotary converter will also drop in speed, its field will be weakened by reason of the drop in speed of the exciter, and consequently the armature of the rotary converter will tend to speed up and pull ahead of the alternating-current system. This is a condition for feeding energy into the alternating-current system the same as when two alternators are connected in parallel, so that when one of them pulls ahead of the other it will supply the greater amount of energy to the circuit.

Assuming now that the direct-current system is overloaded and that consequently its voltage falls off, the voltage of the rotary converter will tend to remain normal, since its speed is controlled by the alternating-current system, and its field is therefore constant and unaffected by the drop in electromotive force in the direct-current system. If the rotary converter were excited from the direct-current mains, its field would vary with the direct-current electromotive force, and the automatic action would be accordingly reduced.

If the direct-current system and the alternating-current system have inherently-rising electromotive forces with increase of load, the automatic transfer of energy may not take place in the right direction; but with falling characteristics the transfer will be such as will tend to assist the overloaded machine.

If the generator of either system is cut out, the rotary converter will supply that system from the other and will tend to give a constant frequency of alternations when freely feeding from the direct-current to the alternating-current system.

I claim as my invention—

1. The combination with an alternating-current circuit and a direct-current circuit, each of which supplies its own translating devices with energy, of a rotary converter electrically connected between the two circuits, an exciter for said converter, and means for driving said exciter substantially in synchronism with the converter.

2. The combination with an alternating-current circuit and a direct-current circuit, each of which supplies its own translating devices with energy, of a rotary converter electrically connected between the two circuits, an exciter for said converter and a mechanical driving connection between the armature of the exciter and the armature of the converter.

3. The combination with an alternating-current circuit and a direct-current circuit respectively supplying energy to translating devices, of means for transferring energy from one circuit to the other in accordance with changes in load comprising a rotary converter electrically connected between the two circuits and having a separately-excited field-magnet winding, an exciter for said winding and means for driving said exciter substantially in synchronism with the alternating-current generator.

In testimony whereof I have hereunto subscribed my name this 9th day of July, 1900.

BENJ. G. LAMME.

Witnesses:
WESLEY G. CARR,
BIRNEY HINES.